(12) United States Patent
Gunna et al.

(10) Patent No.: US 10,826,141 B2
(45) Date of Patent: Nov. 3, 2020

(54) ARRAY FRAME DESIGN FOR ELECTRIFIED VEHICLE BATTERY ARRAYS

(71) Applicant: FORD GLOBAL TECHNOLOGIES, LLC, Dearborn, MI (US)

(72) Inventors: Rohit Gunna, Novi, MI (US); Patrick Daniel Maguire, Ann Arbor, MI (US); George Albert Garfinkel, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 521 days.

(21) Appl. No.: 15/587,427

(22) Filed: May 5, 2017

(65) Prior Publication Data
US 2017/0237131 A1    Aug. 17, 2017

Related U.S. Application Data

(62) Division of application No. 14/446,451, filed on Jul. 30, 2014, now Pat. No. 9,666,843.

(51) Int. Cl.
*H01M 10/6551* (2014.01)
*B60L 11/18* (2006.01)
(Continued)

(52) U.S. Cl.
CPC .......... *H01M 10/6551* (2015.04); *B60L 50/64* (2019.02); *H01M 2/1077* (2013.01);
(Continued)

(58) Field of Classification Search
CPC ........... H01M 2/1077; H01M 2220/20; H01M 10/625; H01M 10/613; H01M 2/206; H01M 10/6555; H01M 10/6551; H01M 10/486; H01M 2250/20; H01M 2/1083; H01M 10/0525; H01M 2/202; H01M 10/643; H01M 2/1241; H01M 10/482; H01M 10/647; H01M 10/6566; H01M 10/14; H01M 10/48; H01M 10/6556; H01M 10/6567; H01M 2200/20; H01M 2/022; H01M 2/0245; H01M 2/1016;
(Continued)

(56) References Cited

U.S. PATENT DOCUMENTS 8,212,522 B2   7/2012   Deal et al.
8,268,474 B2   9/2012   Kim et al.
(Continued)

FOREIGN PATENT DOCUMENTS

DE   102011109216 A1   2/2013
WO   2010/063365 A1   6/2010
(Continued)

*Primary Examiner* — Zhongqing Wei
(74) *Attorney, Agent, or Firm* — David B. Kelley; Carlson, Gaskey & Olds

(57) ABSTRACT

A battery array frame according to an exemplary aspect of the present disclosure includes, among other things, a frame body, and a thermal fin including a body embedded in the frame body and a leg that extends outside of the frame body. The thermal fin is flexible between a first position in which the leg is spaced farther from a surface of the frame body and a second position in which the leg is spaced closer to the surface of the frame body.

16 Claims, 12 Drawing Sheets

(51) Int. Cl.
*H01M 10/625* (2014.01)
*H01M 2/10* (2006.01)
*H01M 10/0525* (2010.01)
*H01M 10/647* (2014.01)
*H01M 10/6555* (2014.01)
*H01M 10/613* (2014.01)
*B60L 50/64* (2019.01)

(52) U.S. Cl.
CPC ..... *H01M 10/0525* (2013.01); *H01M 10/613* (2015.04); *H01M 10/625* (2015.04); *H01M 10/647* (2015.04); *H01M 10/6555* (2015.04); *H01M 2220/20* (2013.01); *H01M 2250/20* (2013.01)

(58) Field of Classification Search
CPC ............. H01M 2/1223; H01M 2/1252; H01M 2/1276; H01M 2/22; H01M 2/24; H01M 10/617; H01M 10/6561; H01M 10/6563; H01M 2/20; H01M 2/30; H01M 2/34
See application file for complete search history.

(56) References Cited

U.S. PATENT DOCUMENTS

| | | |
|---|---|---|
| 8,835,038 B2 | 9/2014 | Abels et al. |
| 8,920,955 B1 | 12/2014 | Chuang et al. |
| 2003/0017384 A1* | 1/2003 | Marukawa .......... H01M 2/1077 429/120 |
| 2009/0061299 A1* | 3/2009 | Uchida ............... H01M 2/1077 429/156 |
| 2009/0220852 A1 | 9/2009 | Fujii |
| 2010/0273042 A1 | 10/2010 | Buck et al. |
| 2012/0003505 A1 | 1/2012 | Kim |
| 2012/0009455 A1 | 1/2012 | Yoon |
| 2012/0171532 A1 | 7/2012 | Lee et al. |
| 2012/0177952 A1 | 7/2012 | Maguire et al. |
| 2012/0196168 A1 | 8/2012 | Hirsch et al. |
| 2013/0040175 A1 | 2/2013 | Yang et al. |
| 2013/0071720 A1 | 3/2013 | Zahn |
| 2013/0095360 A1 | 4/2013 | Niedzwiecki et al. |
| 2013/0255068 A1 | 10/2013 | Turner, III |
| 2014/0023887 A1 | 1/2014 | Lim |

FOREIGN PATENT DOCUMENTS

| | | |
|---|---|---|
| WO | 2012120091 A1 | 9/2012 |
| WO | 2013111959 A1 | 8/2013 |

* cited by examiner

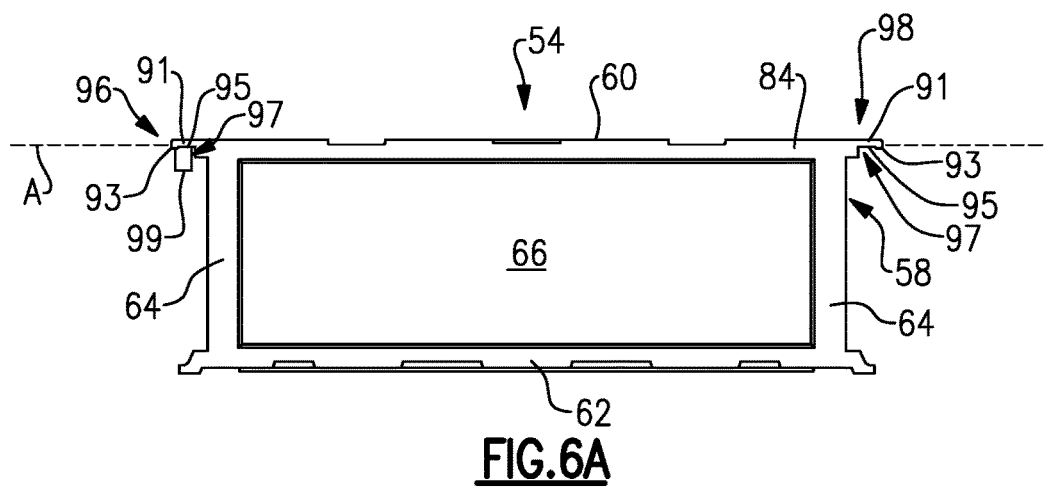
FIG.6A
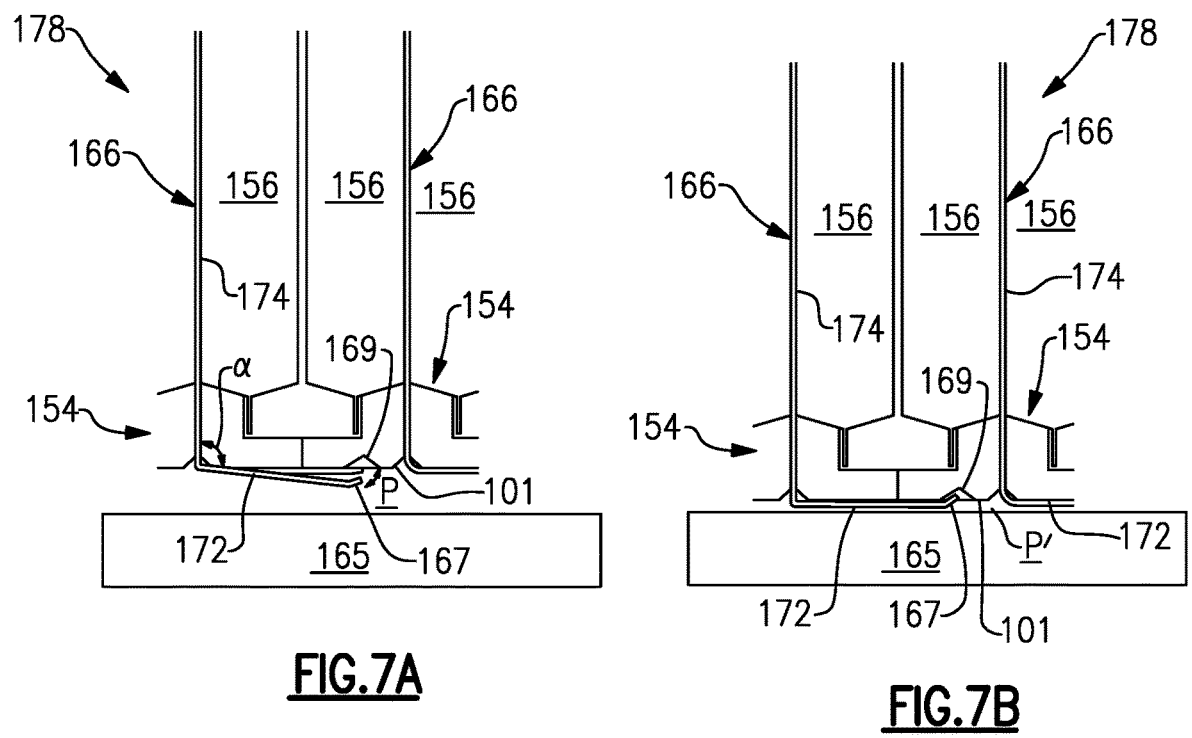
FIG.7A
FIG.7B

ARRAY FRAME DESIGN FOR ELECTRIFIED VEHICLE BATTERY ARRAYS

CROSS REFERENCE TO RELATED APPLICATIONS

This is a divisional of U.S. patent application Ser. No. 14/446,451, which was filed on Jul. 30, 2014.

TECHNICAL FIELD

This disclosure relates to a battery array for an electrified vehicle. The battery array includes unique array frame designs for housing battery cells of the battery array.

BACKGROUND

Electrified vehicles, such as hybrid electric vehicles (HEV's), plug-in hybrid electric vehicles (PHEV's), battery electric vehicles (BEV's), or fuel cell vehicles differ from conventional motor vehicles because they are powered by electric machines (i.e., electric motors and/or generators) instead of or in addition to an internal combustion engine. High voltage current for powering these types of electric machines is typically supplied by a high voltage battery assembly.

Electrified vehicle battery assemblies typically include multiple battery arrays. Each battery array includes a plurality of battery cells. The battery cells must be secured relative to one another. The battery array must also be secured to arrest movement once mounted within the battery assembly.

SUMMARY

A battery array frame according to an exemplary aspect of the present disclosure includes, among other things, a frame body, and a thermal fin including a body embedded in the frame body and a leg that extends outside of the frame body. The thermal fin is flexible between a first position in which the leg is spaced farther from a surface of the frame body and a second position in which the leg is spaced closer to the surface of the frame body.

In a further non-limiting embodiment of the foregoing battery array frame, a battery cell is housed within a pocket on at least one side of the frame body.

In a further non-limiting embodiment of either of the foregoing battery array frames, the thermal fin is segmented into a plurality of leg portions by notches or cuts.

In a further non-limiting embodiment of any of the foregoing battery array frames, the frame body is a unitary plastic structure, and the body is molded or inserted into the structure.

In a further non-limiting embodiment of any of the foregoing battery array frames, the leg extends transversely from the body.

In a further non-limiting embodiment of any of the foregoing battery array frames, the leg extends at an obtuse angle relative to the body in the first position.

In a further non-limiting embodiment of any of the foregoing battery array frames, the leg is perpendicular to the body in the second position.

In a further non-limiting embodiment of any of the foregoing battery array frames, the leg includes a bent end portion.

In a further non-limiting embodiment of any of the foregoing battery array frames, the bent end portion is received within a relief notch in the second position.

In a further non-limiting embodiment of any of the foregoing battery array frames, one end of the body is received in a groove of a top surface of the frame body, an opposite end extends through a passage of a bottom surface of the frame body, and the leg extends beneath the bottom surface.

A battery array according to another exemplary aspect of the present disclosure includes, among other things, a first array frame that includes a thermal fin and a second array frame connected to the first array frame, the second array frame including a relief notch that receives a portion of the thermal fin.

In a further non-limiting embodiment of the foregoing battery array, the relief notch is formed in a bottom surface of the second array frame.

In a further non-limiting embodiment of either of the foregoing battery arrays, the thermal fin includes a body positioned within a frame body of the first array frame and a leg that extends outside of the frame body.

In a further non-limiting embodiment of any of the foregoing battery arrays, the leg includes a bent end portion that is received within the relief notch.

In a further non-limiting embodiment of any of the foregoing battery arrays, the thermal fin is segmented into a plurality of leg portions by notches or cuts.

A method according to another exemplary aspect of the present disclosure includes, among other things, positioning an array frame relative to a cooling plate of a battery array. The array frame including a thermal fin located in a first position during the positioning step. An additional method step includes flexing the thermal fin to a second, different position in response to contacting the cooling plate.

In a further non-limiting embodiment of the foregoing method, the flexing step includes tucking a bent end portion of a leg of the thermal fin into a relief notch of an adjacent array frame.

In a further non-limiting embodiment of either of the foregoing methods, the method includes connecting the array frame to a second array frame prior to the positioning step.

In a further non-limiting embodiment of any of the foregoing methods, the thermal fin includes a body and a leg, and the leg is movable between the first position in which it extends at an obtuse angle relative to the body and the second position in which it is perpendicular to the body.

In a further non-limiting embodiment of any of the foregoing methods, the method includes dissipating heat from a battery cell, into the thermal fin, and then into the cooling plate or adding heat from the cooling plate, into the thermal fin, and then into the battery cell.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 6A, 6B and 6C illustrate lifting arms of additional array frames.

FIGS. 7A, 7B, 7C, 7D and 7E illustrate exemplary thermal fin designs of an array frame according to another embodiment of this disclosure.

DETAILED DESCRIPTION

This disclosure describes a battery array of an electrified vehicle. A plurality of array frames may be stacked and connected to one another to build the battery array. The array frames may include multiple design features for connecting adjacent array frames together. For example, the array frames may include retention features such as rigid and flexible snap arms that engage snap arms of adjacent array frames to build the battery array. The array frames may additionally include recessed grooves that accommodate tension straps, and lifting arms that establish tool engagement areas for lifting and handling the battery arrays. These and other features are discussed in greater detail in the paragraphs that follow.

Figure 1:
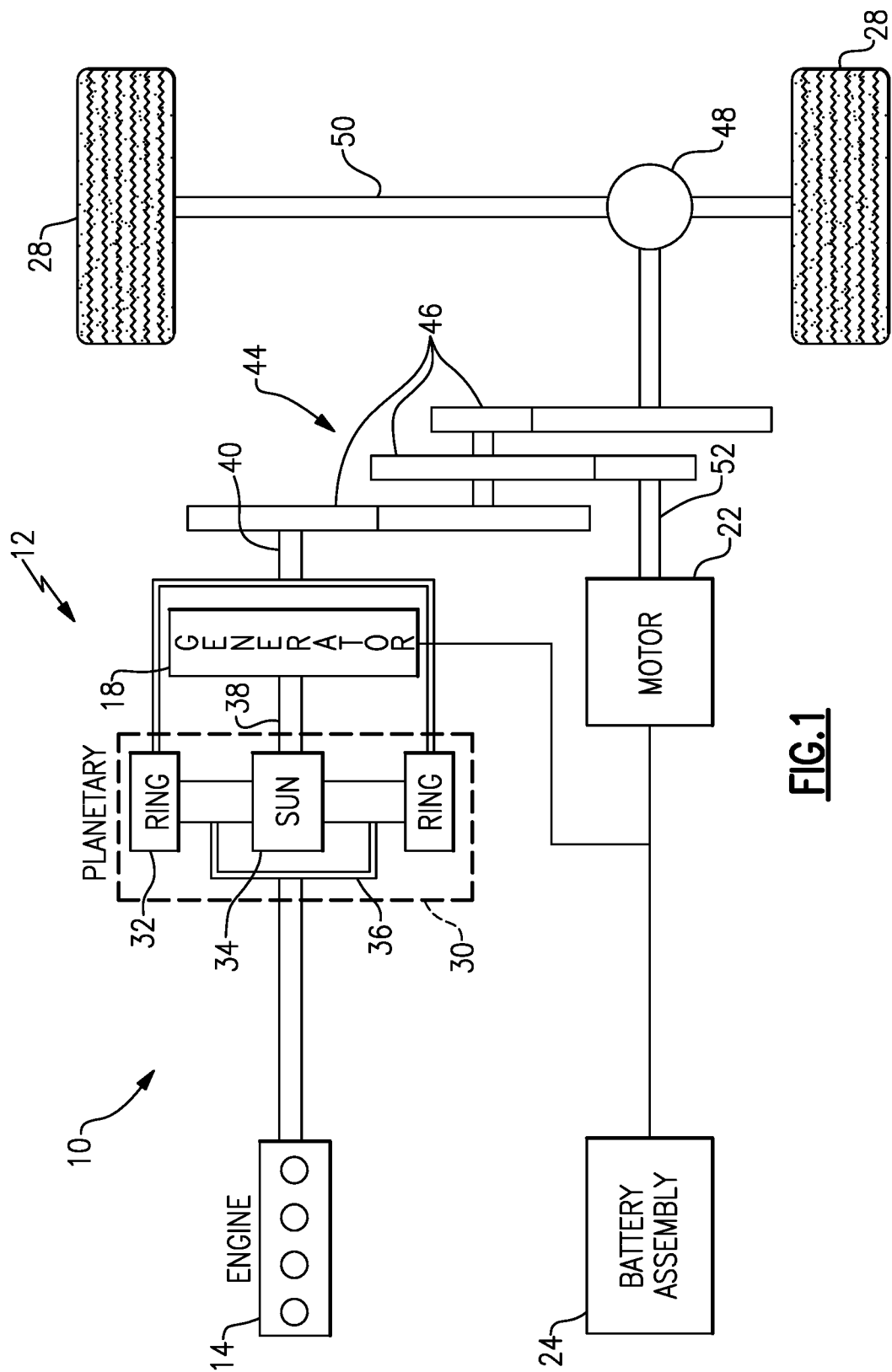
FIG. 1 schematically illustrates a powertrain of an electrified vehicle.

FIG. 1 schematically illustrates a powertrain 10 for an electrified vehicle 12. Although depicted as a HEV, it should be understood that the concepts described herein are not limited to HEV's and could extend to other electrified vehicles, including, but not limited to, PHEV's and BEV's.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, such as an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may include a high voltage battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2A:
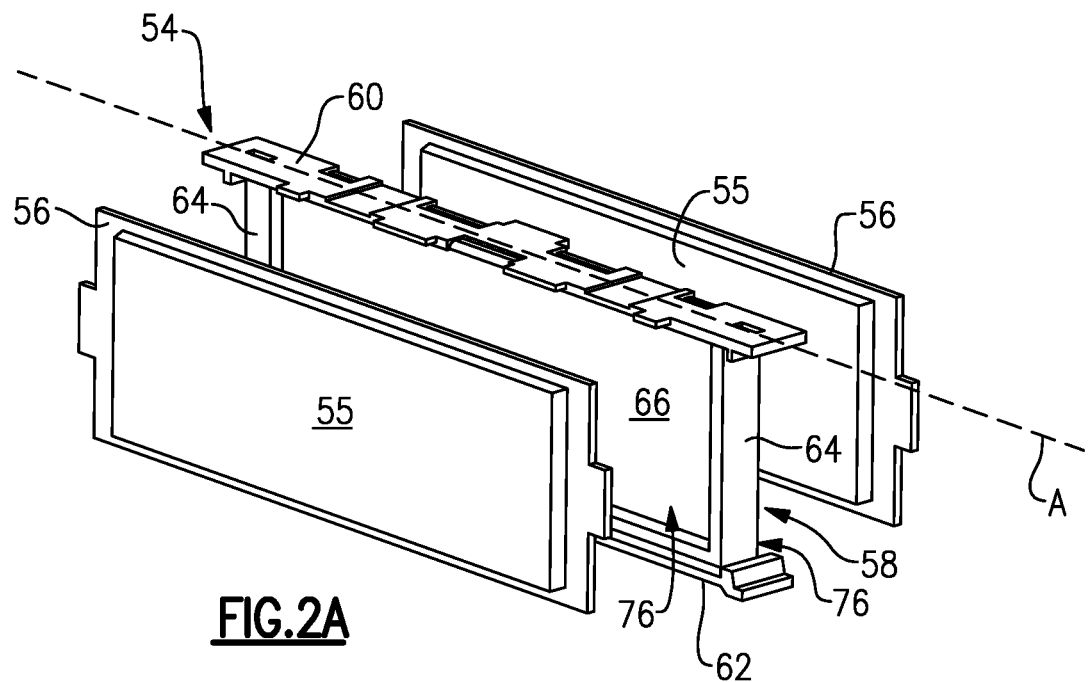
FIGS. 2A and 2B illustrate an array frame according to a first embodiment of this disclosure.
Figure 2B:
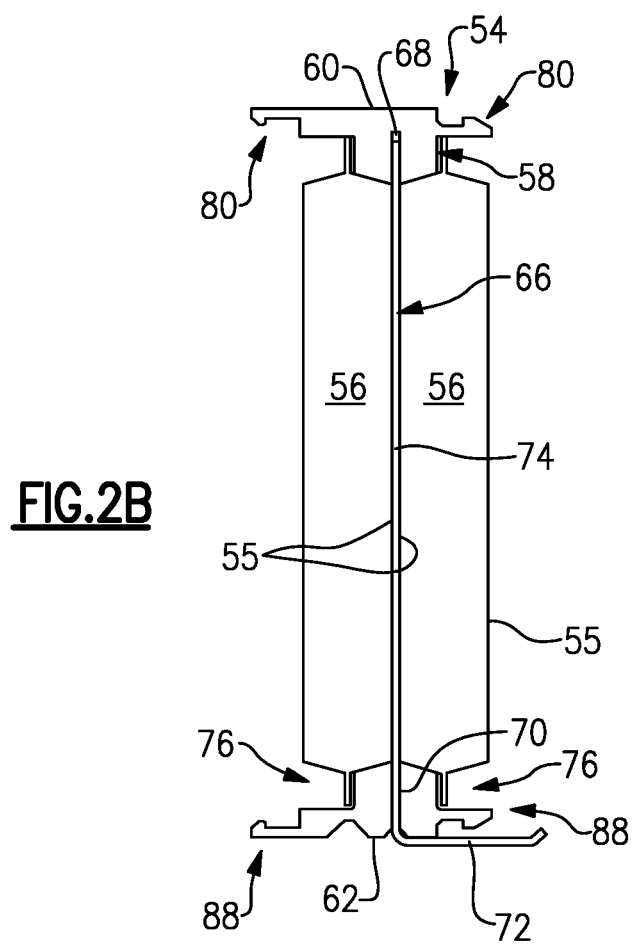

FIGS. 2A and 2B illustrate an array frame 54 that houses at least two battery cells 56. A plurality of array frames 54 may be stacked side-by-side to build a battery array (see, e.g., battery array 78 of FIGS. 3A, 3B and 3C). One or more battery arrays that include multiple array frames 54 and battery cells 56 can be assembled and mounted inside a battery pack that is employed by a battery assembly, such as the battery assembly 24 of the electrified vehicle 12 of FIG. 1, to electrically power an electrified vehicle.

In one embodiment, the battery cells 56 are pouch cells for a high voltage battery assembly. One non-limiting example of a suitable pouch battery cell is a lithium-ion polymer battery. However, other types of battery cells are also contemplated.

The array frame 54 includes a frame body 58 that extends along a longitudinal axis A (see FIG. 2A). The frame body 58 includes a top surface 60, a bottom surface 62 and frame arms 64 that connect between the top surface 60 and the bottom surface 62. In one embodiment, the top surface 60 and the bottom surface 62 extend in parallel with the longitudinal axis A, and the frame arms 64 are transverse to the longitudinal axis A. In another embodiment, the frame body 58 is a unitary, plastic structure.

A thermal fin 66 may be partially embedded within the frame body 58 and extend between the top surface 60 and the bottom surface 62. In one embodiment, the thermal fin 66 is an aluminum thermal fin. However, other materials are additionally contemplated. The thermal fin 66 separates the battery cells 56 and may be in contact with side faces 55 of the battery cells 56. During certain conditions, the thermal fin 66 removes heat from the battery cells 56. In other conditions, the thermal fin 66 adds heat to the battery cells 56. The frame body 58 establishes pockets 76 on both sides of the thermal fin 66. The battery cells 56 may be received within the pockets 76 to house the battery cells 56 within the array frame 54.

In one embodiment, the thermal fin 66 includes a body 74 and a leg 72 that extends from the body 74. The body 74 may be embedded or molded into the frame body 58, while the leg 72 extends outside of the frame body 58. In another embodiment, the thermal fin 66 may be inserted into the frame body 58 such that one end of the body 74 is located within a groove 68 formed in the top surface 60 of the frame body 58, and an opposite end of the body 74 may extend through a passage 70 formed through the bottom surface 62 of the frame body 58. The leg 72 of the thermal fin 66 may be oriented transversely to the body 74 so it extends underneath the bottom surface 62 to the position outside of the frame body 58. The leg 72 may contact a cooling plate or a thermal interface material (not shown in FIGS. 2A, 2B) to dissipate any heat absorbed from the battery cells 56. In one embodiment, the leg 72 extends to a position that is beyond the side face 55 of the battery cell 56 housed substantially above the leg 72.

The frame body 58 may include a plurality of retention features 80 that are integrated into the top surface 60. The bottom surface 62 may similarly include a plurality of integrated retention features 88. The retention features 80, 88 may engage corresponding retention features of adjacent array frames to build a battery array, as discussed in greater detail below. In yet another embodiment, the frame arms 64 may include retention features similar to the retention features 80, 88.

Figure 3A:
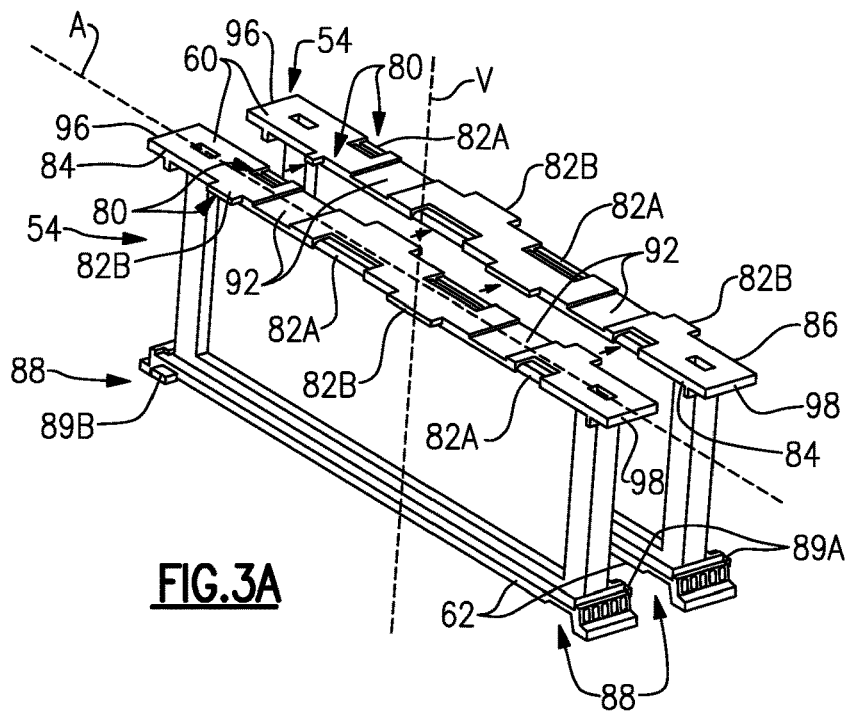
FIGS. 3A and 3B illustrate the stacking of multiple array frames to build a battery array.
Figure 3B:
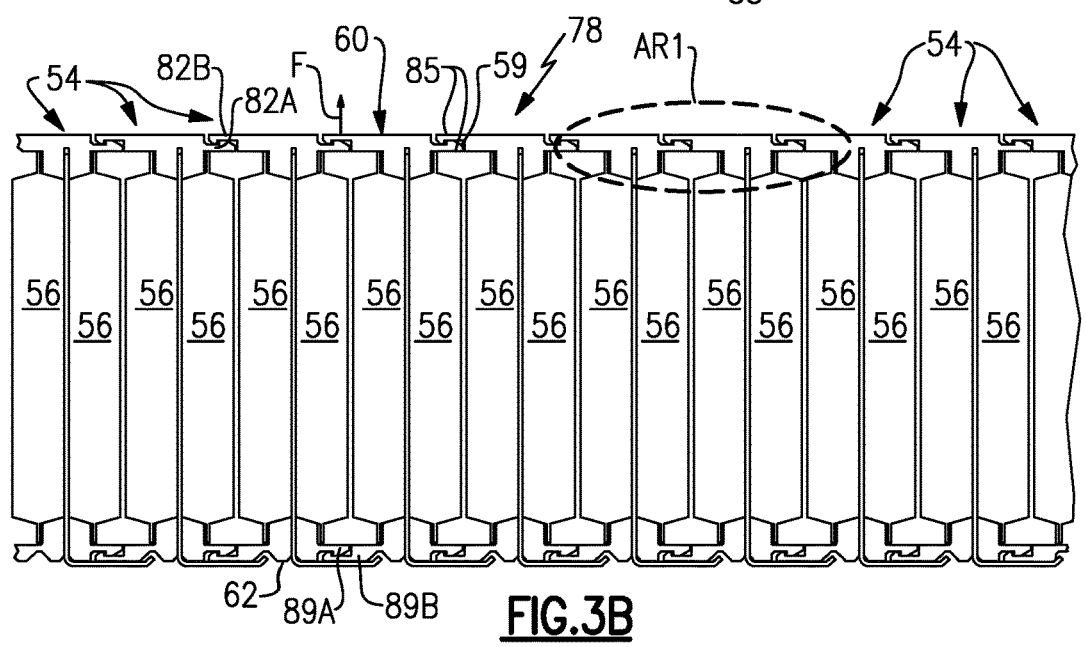
Figure 3C:
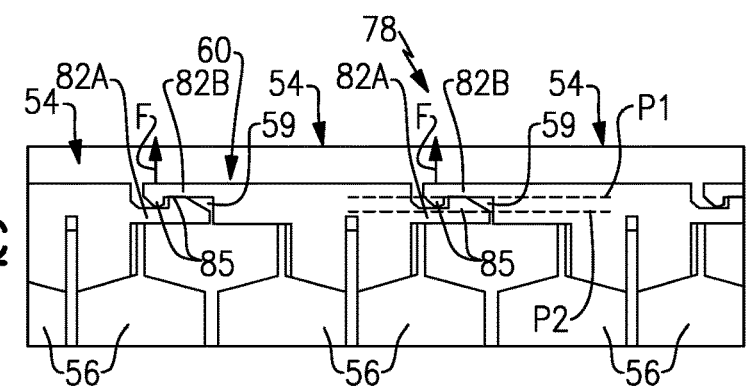
FIG. 3C is a blown-up view of encircled area AR1 of FIG. 3B.

Referring to FIGS. 3A, 3B and 3C, a plurality of array frames 54 may be stacked side-by-side to construct a battery array 78. The battery array 78 includes a plurality of array frames 54 that house a plurality of battery cells 56. Two array frames 54 are depicted in FIG. 3A, which omits the battery cells for clarity, and a plurality of array frames 54 including the battery cells 56 are depicted in FIGS. 3B and 3C. This disclosure is not limited to a specific number of array frames 54 and/or battery cells 56 and is not intended to be limited to the specific configurations shown by these Figures.

Figure 3D:
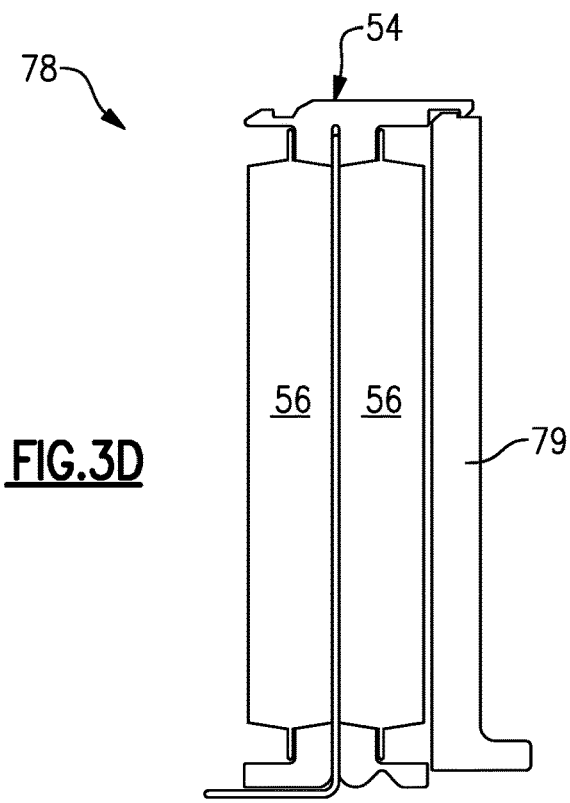
FIG. 3D illustrates a battery array end plate connectable to an array frame.

In one embodiment, the top surface 60 of the frame body 58 of the array frame 54 is rotationally symmetric about a vertical axis V that is transverse to the longitudinal axis A. In another embodiment, the bottom surface 62 is rotationally symmetric about the vertical axis V. In yet another embodiment, both the top surface 60 and the bottom surface 62 are rotationally symmetric about the vertical axis V. In this way, the array frames 54 can be provided in a repeating fashion to construct the battery array 78. The symmetry of the top surface 60 and/or the bottom surface 62 permits the use of common array end plates, thereby reducing cost and complexity of the battery array 78. In other words, unique left hand and right hand array end plates are not required to construct the battery array 78. In another embodiment, the battery array 78 may include an end plate 79 that is connectable to the array frame 54 (see FIG. 3D).

The top surface 60 of the frame body 58 includes a first side 84 and a second side 86 that both extend between opposing ends 96, 98 (see FIG. 3A). The first side 84 and the second side 86 both include a plurality of retention features 80 for connecting the array frame 54 to an adjacent array frame 54. In one embodiment, the retention features 80 protrude from both the first side 84 and the second side 86 of the top surface 60. In one embodiment, the top surface 60 of each array frame 54 is substantially flat.

In another non-limiting embodiment, the retention features 80 of the top surface 60 include a plurality of rigid snap arms 82A and a plurality of flexible snap arms 82B oriented in an alternating pattern along each of the first side 84 and the second side 86 of the top surface 60. Because the top surface 60 is rotationally symmetric about the vertical axis V, each flexible snap arm 82B of the first and second sides 84, 86 are aligned directly across the top surface 60 from a rigid snap arm 82A on the opposite side 84, 86. Thus, the array frames 54 provide a repeating design that simplifies assembly and reduces complexity of the battery array 78.

The rigid snap arms 82A and the flexible snap arms 82B of both the first side 84 and the second side 86 are oriented to engage corresponding features of an adjacent array frame 54 to connect the array frames 54 together. For example, as best illustrated in FIGS. 3B and 3C, the flexible snap arms 82B may be received over top of the rigid snap arms 82A to connect adjacent array frames 54. The flexible snap arms 82B may flex slightly in a direction F as the rigid snap arms 82A are pushed toward the flexible snap arms 82B. In one embodiment, the rigid snap arms 82A and the flexible snap arms 82B each include nubs 85 that snap together in an abutting fashion to connect adjacent array frames 54 together. The nubs 85 may be slightly ramped in order to create enough force during contact to move the flexible snaps arms 82B in the direction F and allow the rigid snap arms 82A to pass into a groove 59 located under the flexible snap arms 82.

In another embodiment, the flexible snap arms 82B extend in a plane P1 and the rigid snap arms 82A extend in a different plane P2. The plane P1 is offset from the plane P2, and in some embodiments is located vertically above the plane P2 to provide an engagement area for these features to snap together. In addition, because the flexible snap arms 82B are exposed at a location that is external to the rigid snap arms 82A, the array frames 54 can be accessed and disassembled if necessary.

Figure 5:
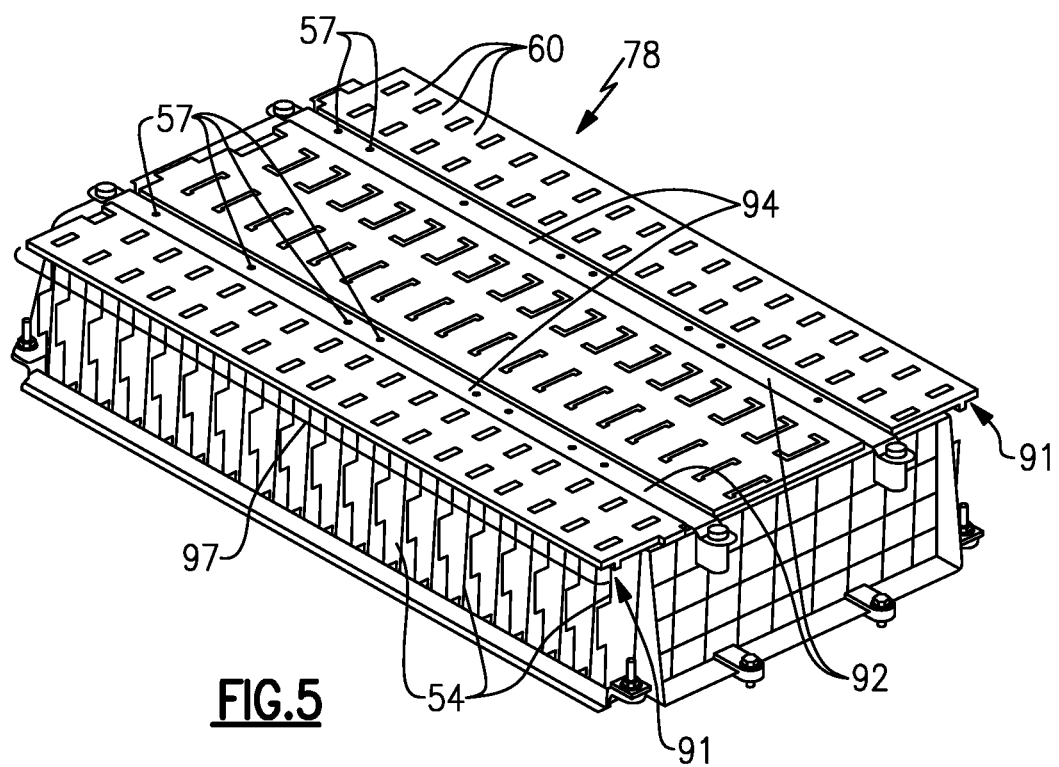
FIG. 5 illustrates a battery array built using multiple array frames.

The top surface 60 of each array frame 54 may additionally include one or more recessed grooves 92 (see FIG. 3A). In one embodiment, each recessed groove 92 extends between the first side 84 and the second side 86 of the top surface 60 and is disposed between a rigid snap arm 82A and a flexible snap arm 82B on the first side 84 and the second side 86. The recessed grooves 92 of adjacent array frames 54 align with one another to accommodate tension straps 94 (see FIG. 5). The tension straps 94 bind the battery array 78 in a lengthwise direction to maintain a consistent array length and resist bulging of the battery cells 56 during certain conditions. The recessed grooves 92 seat the tension straps 94 flush with the top surfaces 60 of the array frames 54 to avoid interfering with additional arrays that may be stacked on top of the battery array 78.

In one non-limiting embodiment, the tension straps 94 include detents 57 (see FIGS. 4A and 5) that are stamped into the tension straps 94. The detents 57 may extend toward either the top surface 60 or the bottom surface 62 of the array frames 54. The detents 57 may reduce rattle of the tension straps 94.

In another embodiment, the bottom surfaces 62 of the array frames 54 include a plurality of retention features 88. Similar to the retention features 80 of the top surface 60, the retention features 88 may include both rigid snap arms 89A and flexible snap arms 89B. The flexible snap arms 89B are located outside of, which in this embodiment is beneath, the rigid snap arms 89A so they are accessible to disassemble the array frames 54. In one non-limiting embodiment, the rigid snaps arms 89A are disposed directly across the bottom surface 62 from a flexible snap arm 89B. In another embodiment, the retention features 88 are provided only at the outside edges, such as within the outer quarters of the bottom surface 62 (see FIG. 3A).

Figure 4A:
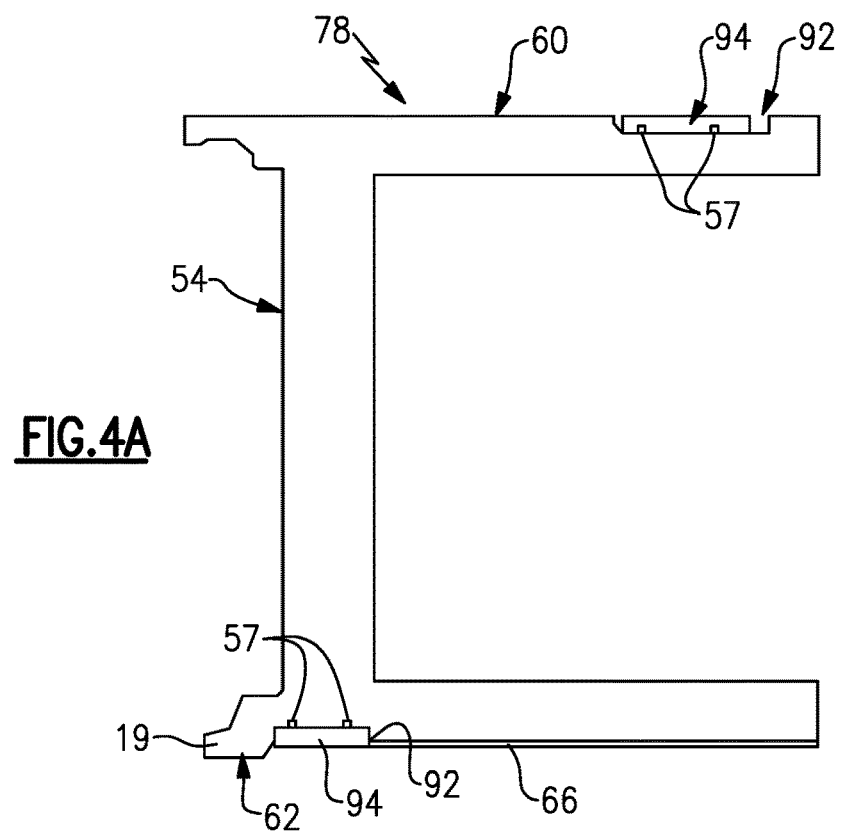
FIGS. 4A and 4B illustrate recessed grooves of additional array frames.
Figure 4B:
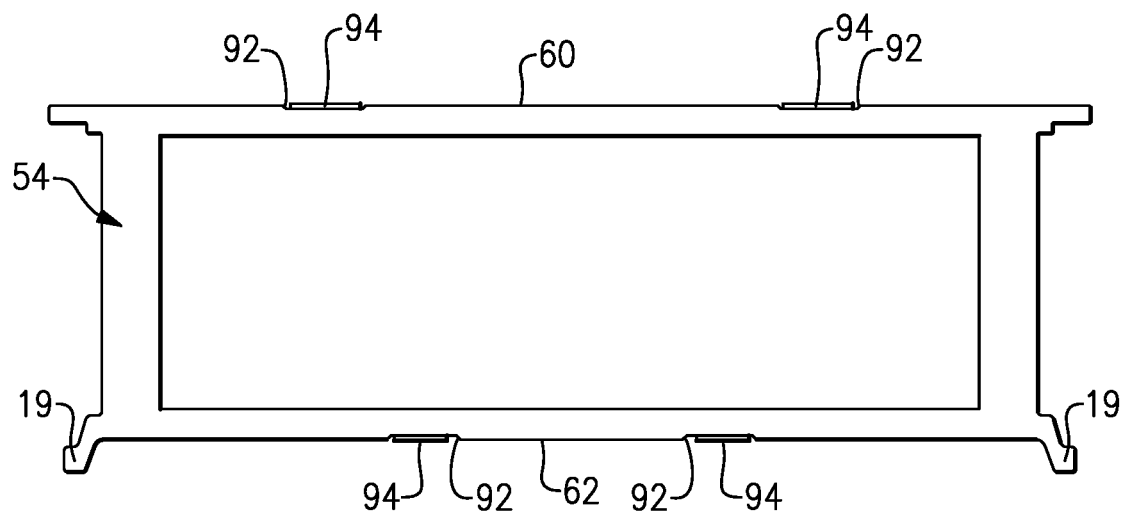

In another embodiment, as shown in FIGS. 4A and 4B, the bottom surface 62 of each array frame 54 can be equipped with one or more recessed grooves 92. The recessed grooves 92 may accommodate additional tension straps 94 that extend along a bottom of the battery array 78. In one embodiment, the recessed grooves 92 of the bottom surfaces 62 of the array frames 54 are positioned outboard of the thermal fins 66 and are positioned between the thermal fin 66 and a foot 19 of the bottom surface 62 (see FIG. 4A). In another embodiment, the recessed grooves 92 and tension straps 94 are positioned between opposing feet 19 of the bottom surface 62 of the array frame 54 (see FIG. 4B). A center of the bottom surface 62 may be elevated relative to the feet 19.

Figure 6B:
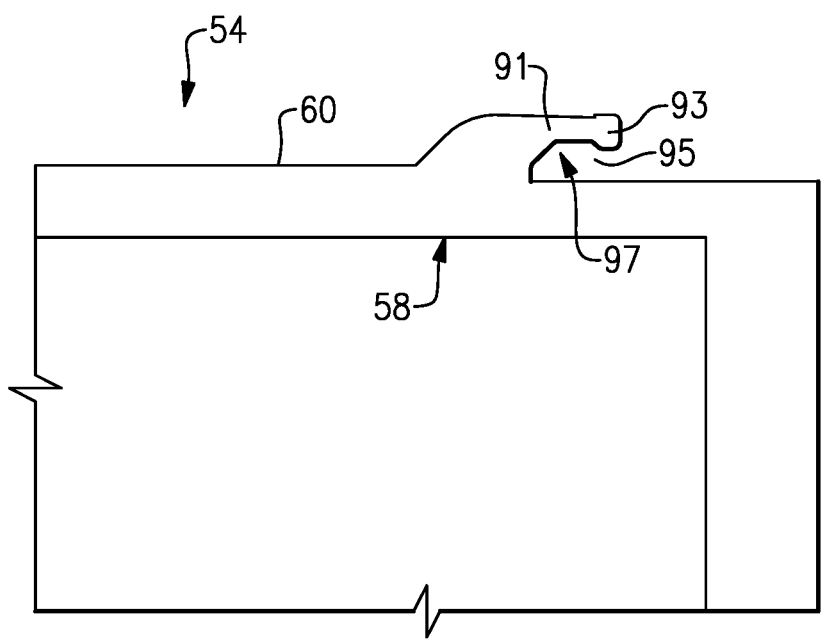

FIG. 6A illustrates additional features of an array frame 54. In one embodiment, the top surface 60 of the frame body 58 of the array frame 54 includes opposing ends 96, 98. The first side 84 and the second side 86 (only the first side 84 is shown in the side view of FIG. 6A) connect between the opposing ends 96, 98.

In this embodiment, each of the opposing ends 96, 98 includes a lifting arm 91. The lifting arms 91 are disposed along the longitudinal axis A. In one embodiment, the lifting arms 91 extend outboard of, or laterally beyond, the frame arms 64 of the frame body 58. In other words, the lifting arms 91 jut outwardly from the array frame 54 beyond a periphery established by the frame arms 64. In another embodiment, the lifting arms 91 extend upwardly from the top surface 60 of the array frame 58 (see FIG. 6B).

Figure 6C:
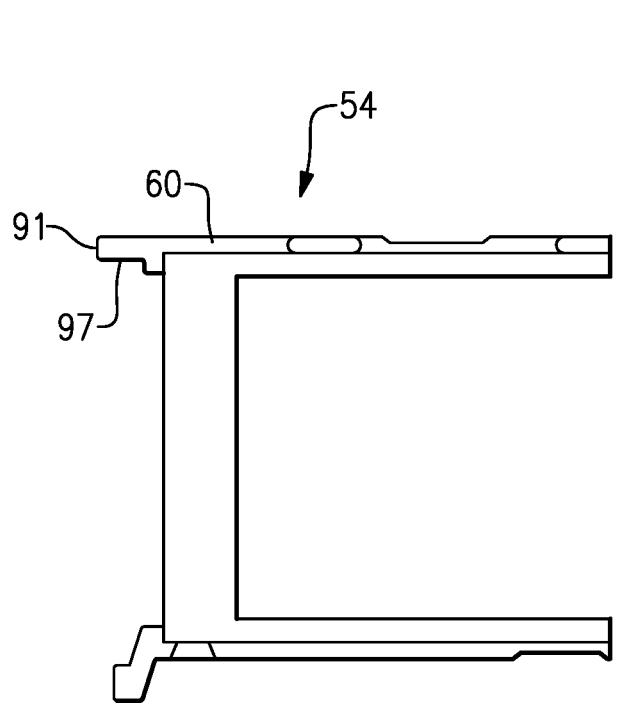

Each lifting arm 91 may include a lip 93 and a recess 95. In one embodiment, the recess 95 is directly inboard of the lip 93. The recess 95 of each lifting arm 91 establishes an engagement area 97 for lifting and handling a battery array 78 that is constructed of a plurality of the array frames 54. Alternatively, the lifting arm 91 may eliminate the recess 95 and provide a substantially flat engagement area 97 (see FIG. 6C).

A lifting tool 99 may engage the engagement area 97 on each of the opposing ends 96, 98 of the array frame 54. For example, in one non-limiting embodiment, the recesses 95 of the lifting arms 91 of adjacent array frames 54 align to establish a uniform engagement area 97 for lifting and handling a battery array 78 (see, e.g., FIG. 5). In other words, the connected array frames 54 can be lifted as a single-unit using the lifting arms 91.

FIGS. 7A and 7B illustrate a battery array 178 according to another embodiment of this disclosure. In this disclosure, like reference numbers designate like elements where appropriate and reference numerals with the addition of 100 or multiples thereof designate modified elements that are understood to incorporate the same features and benefits of the corresponding original elements.

The battery array 178 of this embodiment is constructed of multiple array frames 154 that house battery cells 156. The array frames 154 are positioned side-by-side and can be connected to one another to build the battery array 178. Each array frame 154 includes a thermal fin 166 that is molded into or otherwise embedded within the array frame 154. The thermal fins 166 separate the battery cells 156 housed by each array frame 154.

In one embodiment, each thermal fin 166 includes a body 174 and a leg 172 that extends from the body 174. The leg 172 may be transverse to the body 174 so that it extends along an underside of the array frame 154 to a position outside of the array frame 154. In other words, unlike the body 174, the leg 172 is not encased or embedded within the array frame 154.

In one embodiment, the leg 172 of each thermal fin 166 is flexible between a first position P (see FIG. 7A) and a second position P' (see FIG. 7B) to promote improved contact with a cooling plate 165 of the battery array 178. The battery array 178 may rest on top of the cooling plate 165 when assembled. The legs 172 of each thermal fin 166 may contact the cooling plate 165 (or a thermal interface material) to dissipate any heat absorbed from the battery cells 156 or to heat up the battery cells 156.

In the first position P, the leg 172 of each thermal fin 166 may extend at an obtuse angle α relative to the body 174. Therefore, the leg 172 can flex to the second position P' as the battery array 178 is moved into position atop the cooling plate 165. In the second position P', the leg 172 of each thermal fin 166 may be substantially perpendicular to the body 174.

In another embodiment, the leg 172 of each thermal fin 166 additionally includes a bent end portion 167. Each bent end portion 167 may be tucked into a relief notch 169 formed in a surface 101 of an adjacent array frame 154 when the leg 172 is moved to the second position P'. This helps avoid damaging a thermal interface material that may be located on the cooling plate 165. In this embodiment, the surface 101 is a bottom surface of the adjacent array frame 154. Therefore, the battery array 178 may be stacked on the cooling plate 165 without the thermal fins 166 interfering with the stacking. In yet another embodiment, the leg 172 of each thermal fin 166 is spaced from the surface 101 in the first position P and abuts the surface 101 in the second position P'.

Figure 7C:
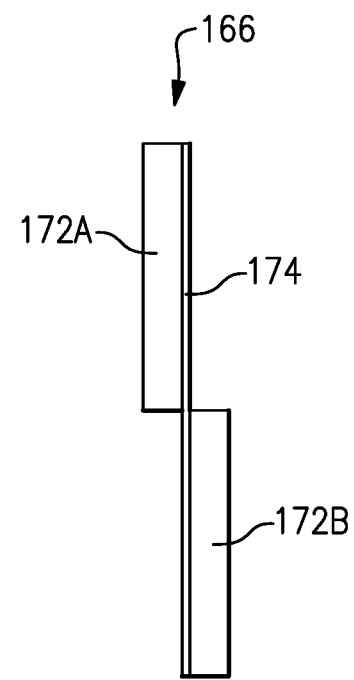

In another embodiment, shown in the top view of FIG. 7C, the thermal fin 166 includes a first leg 172A and a second leg 172B that extend from a body 174. In one embodiment, the first leg 172A and the second leg 172B extend in opposite directions from the body 174 such that the thermal fin 166 is rotationally symmetric. A rotationally symmetric thermal fin 166 may allow for a shorter cold plate design when used in conjunction with a rotationally symmetric array frame 154.

Figure 7D:
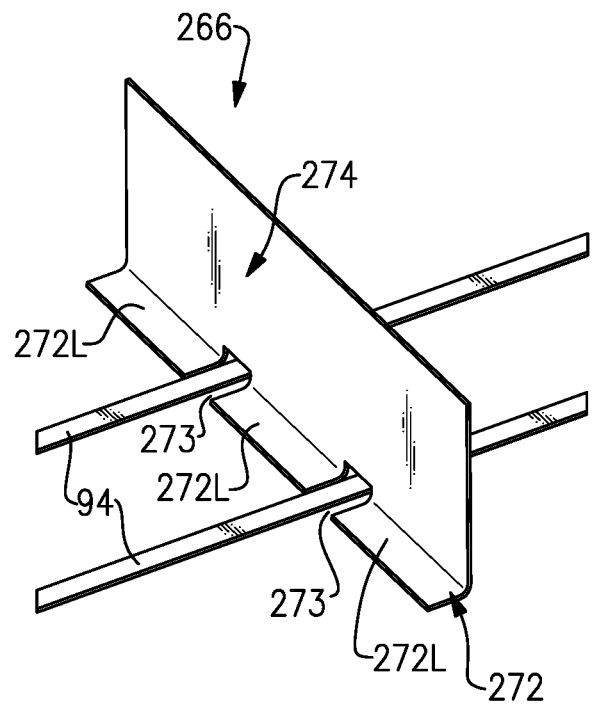
Figure 7E:
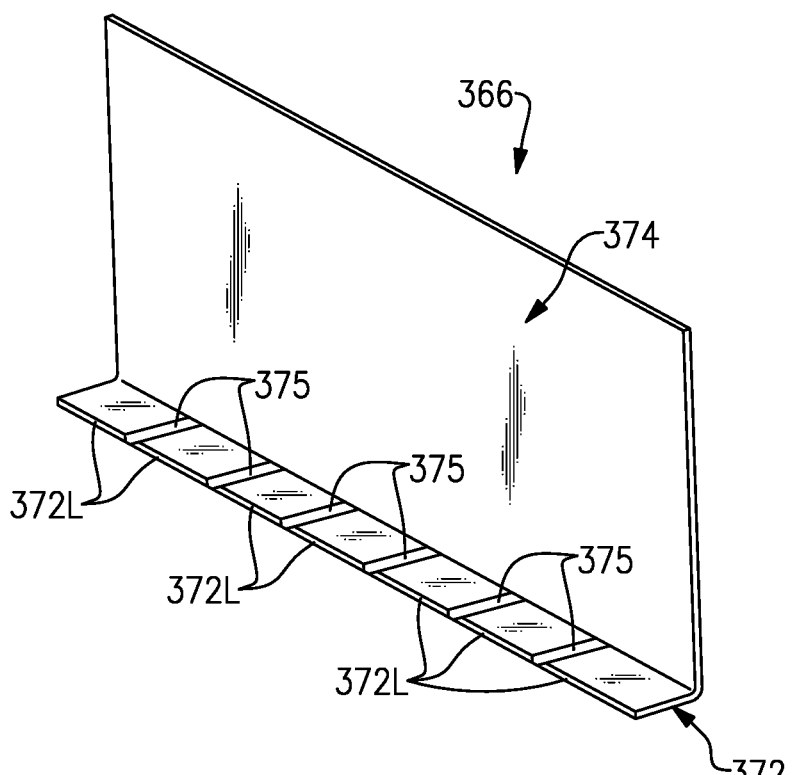

FIGS. 7D and 7E illustrate segmented thermal fins 266, 366, respectively. In the embodiment of FIG. 7D, the thermal fin 266 is a segmented thermal fin that includes a body 274 and a leg 272 that extends transversely from the body 274. One or more notches 273 may be formed in the leg 272 to provide multiple leg portions 272L. The notches 273 may accommodate tension straps 94, in one non-limiting embodiment.

In the additional embodiment of FIG. 7E, the thermal fin 366 may include a body 374 and a leg 372 that extends transversely from the body 374. One or more cuts 375 may extend into the leg 372 to form multiple leg portions 372L. The cuts 375 segment the thermal fin 366 to allow each leg portion 372L to position itself independently of the other leg portions 372L, thereby promoting improved contact with a cooling interface (e.g., a tray or cold plate). In other words, the leg portions 372L can provide improved heat transfer by better conforming to the shape of a cold plate.

Figure 8:
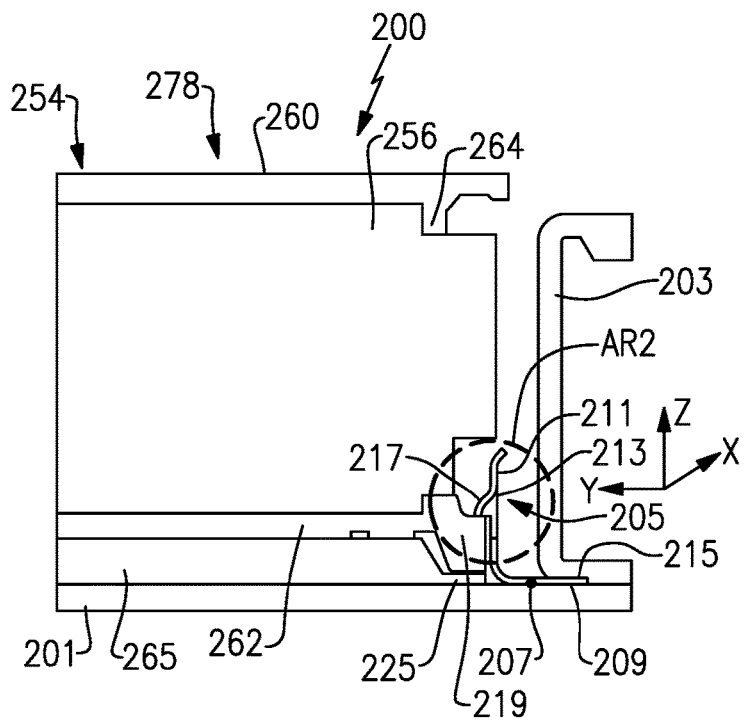
FIG. 8 illustrates a battery pack according to an embodiment of this disclosure.
Figure 9:
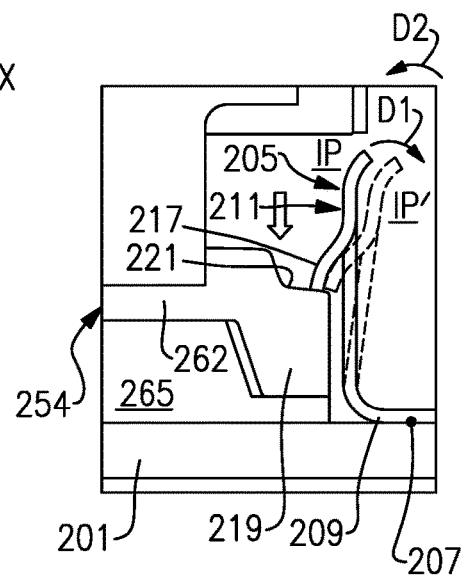
FIG. 9 is a blown-up view of encircled area AR2 of FIG. 8.

FIGS. 8 and 9 illustrate a battery pack 200 that includes at least one battery array 278. The battery array 278 may include one or more of the features described above with respect to FIGS. 2-7. In one non-limiting embodiment, the battery array 278 includes array frames 254 that house battery cells 256. The array frames 254 each include a top surface 260, a bottom surface 262 and frame arms 264 that connect between the top surface 260 and the bottom surface 262.

The battery array 278 is positioned on a tray 201 of the battery pack 200. A cooling plate 265 may be positioned between the tray 201 and the bottom surface 262 of each array frame 254, in one embodiment. In another non-limiting embodiment, an extension 225 of the cooling plate 265 extends between a foot 219 of the bottom surface 262 of each array frame 254 and the tray 201. One or more walls 203 of the battery pack 200 may surround the battery array 278.

The battery array 278 may be retained to the tray 201 of the battery pack 200 using one or more retention clips 205. In one embodiment, multiple individual retention clips 205 may be periodically spaced along a length of the battery array 278 to retain the battery array 278 to the tray 201. The retention clips 205 are mounted to the tray 201, and in one embodiment are welded to the tray 201 as indicated by weld bead 207. Other mounting methodologies are also contemplated.

Each retention clip 205 may include a base 209 and a clip arm 211 that extends from an end 213 of the base 209 opposite from an end 215 that is received against the tray 201. The clip arm 211 may include an undulated shaped body. In one embodiment, the clip arms 211 include an extension 217 that engages the foot 219 of the bottom surface 262 of each array frame 254 to retain the battery array 278 to the tray 201. When received against the feet 219, the retention clips 205 arrest movement of the battery array 278 in the Z direction and at least partially in the X and Y directions. Therefore, the battery array 278 can be retained to the tray 201 without using threaded fasteners or the like.

Referring to FIG. 9, which is a blown-up view of encircled area AR2 of FIG. 8, the exemplary retention clip 205 is flexible between an installed position IP (i.e., a first position) and an installation position IP' (i.e., a second position, shown in phantom). In one embodiment, the extension 217 of the clip arm 211 is received against a sloped portion 221 of the foot 219 when the retention clip 205 is positioned in the installed position IP, and the clip arm 211 is displaced from the foot 219 of the array frame 254 when the retention clip 205 is positioned in the installation position IP'.

The retention clip 205 may be flexed in a first direction D1 to position it in the installation position IP', and may be flexed in a second direction D2 to return the retention clip 205 back to the installed position IP. In one embodiment, the retention clip 205 is biased in the direction D2, or toward the installed position IP. Therefore, during installation of the battery array 278, the retention clip 205 is first moved to the installation position IP' by applying a force in the first direction D1. Once the battery array 278 is in a desired position on the tray 201, the retention clip 205 may be returned to the installed position IP to retain the battery array 278 in place.

Figure 10A:
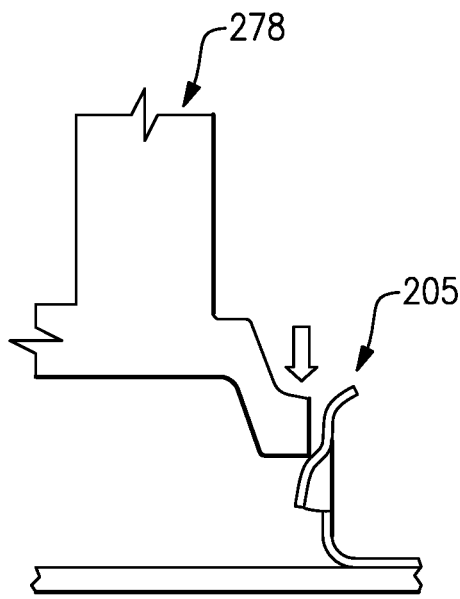
FIGS. 10A, 10B and 10C illustrate an installation procedure of a battery array having the features of FIGS. 8 and 9.
Figure 10B:
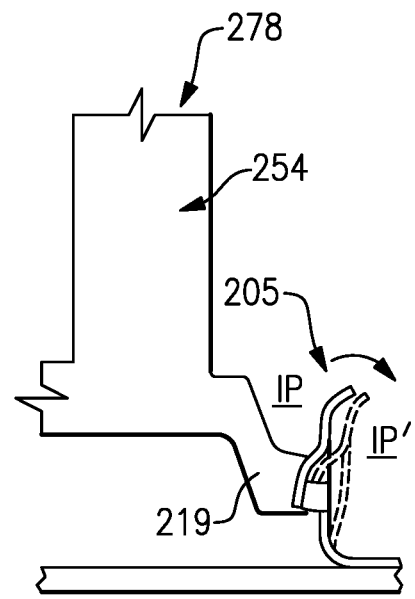
Figure 10C:
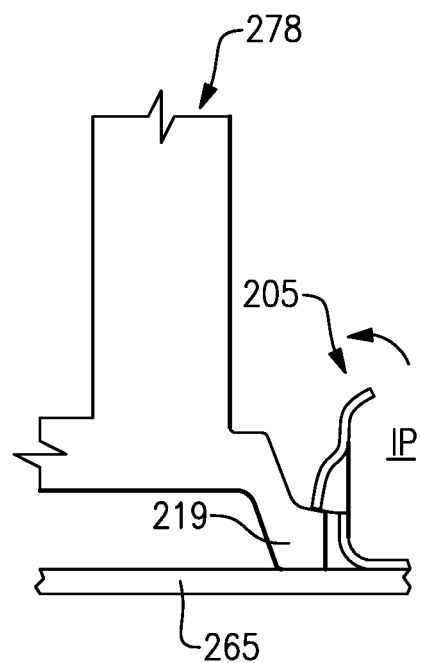

One non-limiting installation method is schematically illustrated in FIGS. 10A, 10B and 10C. In this method, the battery array 278 creates the force necessary to displace the retention clip 205. First, the battery array 278 is lowered into position relative to the retention clip 205 (see FIG. 10A). Next, one or more feet 219 of the array frames 254 of the battery array 278 may engage the retention clip 205 and cause it to flex from the installed position IP to the installation position IP' (see FIG. 10B). The feet 219 are moved until they make contact with the cold plate 265. Once the battery array 278 is properly positioned, the retention clip 205 can automatically return toward the installed position IP.

In the embodiment illustrated in FIGS. 10A-10C, the retention clip 205 is a flexible construct and the feet 219 of the array frames 254 are rigid constructs. However, an opposite configuration is also contemplated in which the retention clip is rigid and the feet of the array frames are flexible.

Figure 10D:
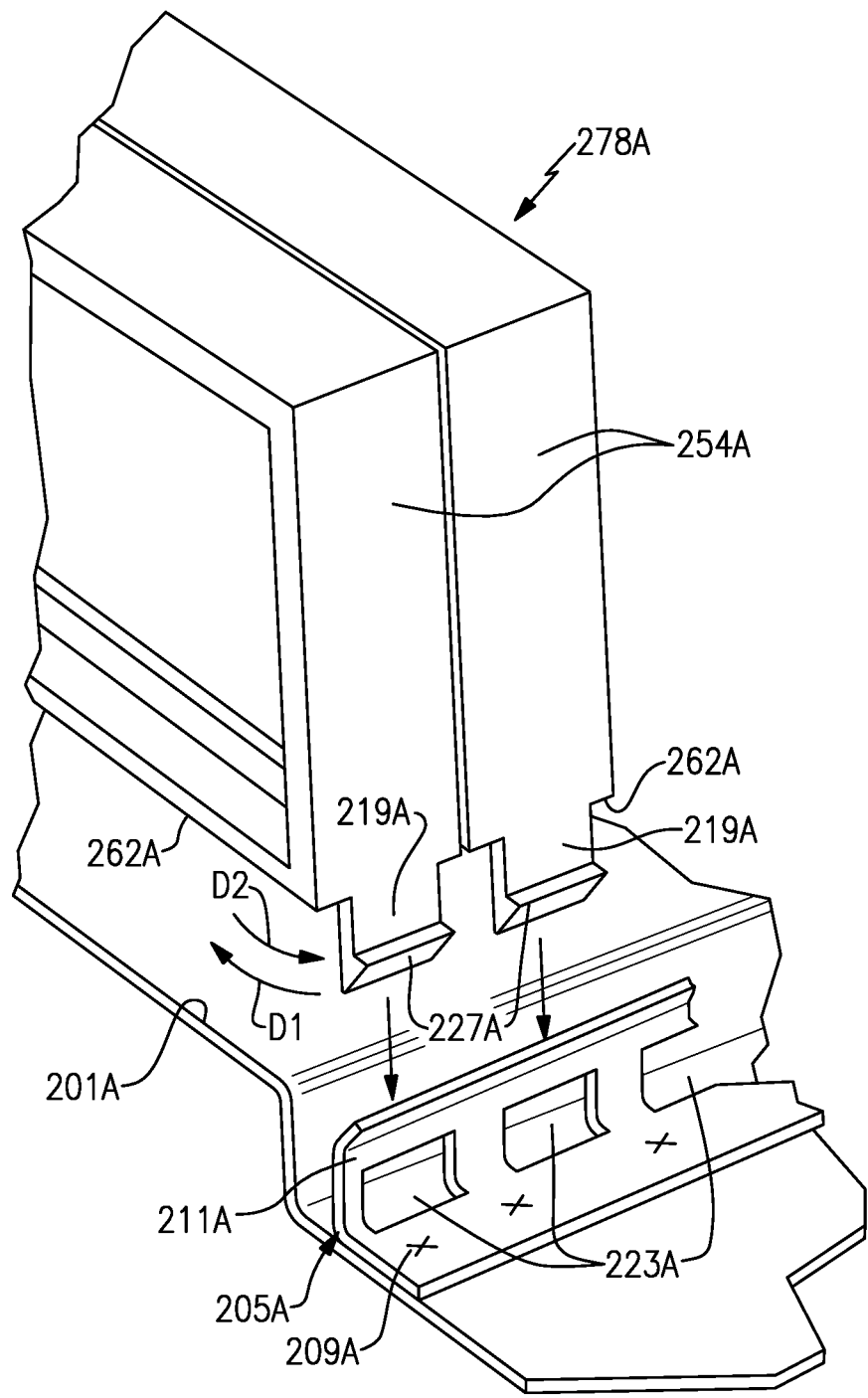
FIG. 10D illustrates another battery pack installation procedure.

For example, as shown in the additional embodiment of FIG. 10D, flexible feet 219A may extend from one or more array frames 254A of a battery array 278A. In one embodiment, the feet 219A extend from a bottom surface 262A of each array frame 254A toward a tray 201A. The feet 219A may include ledges 227A that protrude outwardly from the feet 219A. A rigid retention clip 205A is mounted to the tray 201A and may include a base 209A and a clip arm 211A that extends upwardly from the base 209A. The clip arm 211A may include multiple openings 223A for receiving the ledges 227A of the feet 219A of the array frames 254A to secure the array frames 254A to the tray 201A.

During a non-limiting mounting procedure, the feet 219A may flex in a first direction D1 in response to contacting the clip arm 211A of the rigid retention clip 205A. Once the feet 219A have flexed far enough in the direction D1 that the ledges 227A are able to avoid interference with the clip arm 211A, the feet 219A may flex in a second direction D2 that is opposite of the first direction D1 to position the ledges 227A into the openings 223A and retain the array frame 254A, and thus the battery array 278A, to the tray 201A.

Figure 11:
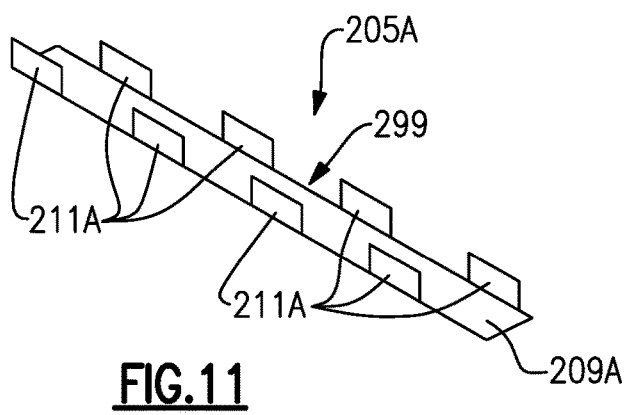
FIG. 11 illustrates a retention clip assembly according to an embodiment of this disclosure.
Figure 12:
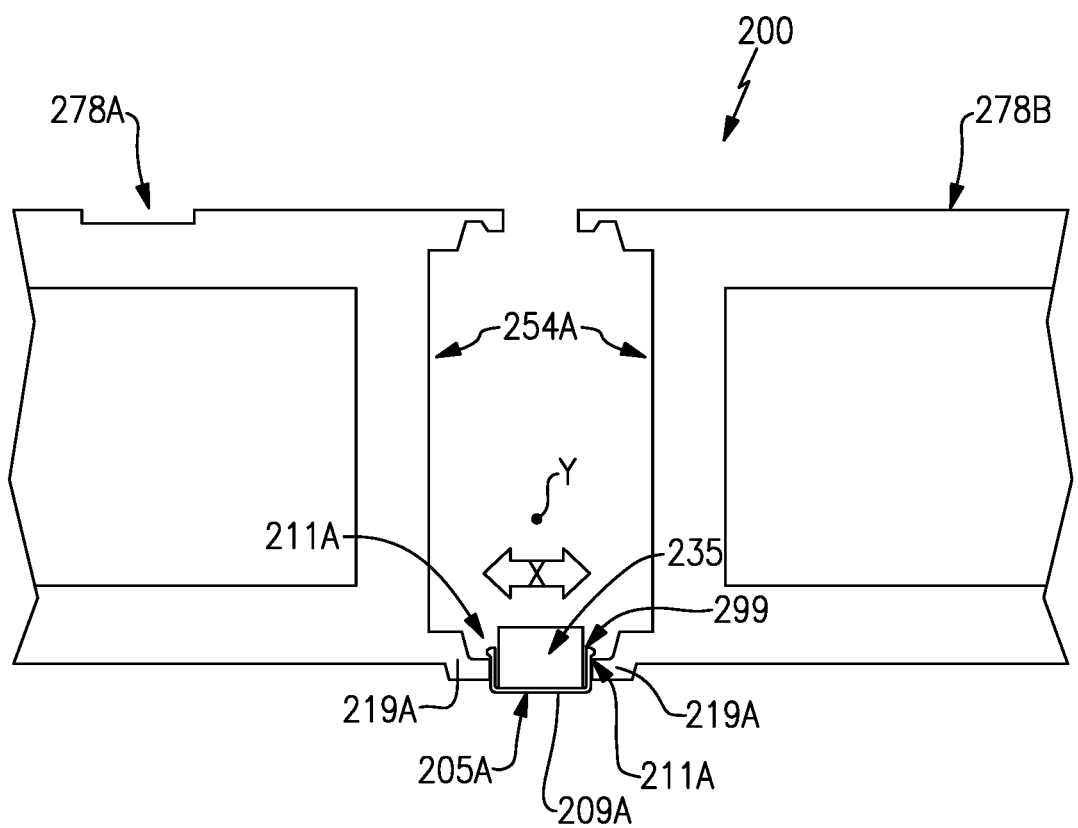
FIG. 12 illustrates a cross-sectional view of a battery pack that utilizes the retention clip assembly of FIG. 11.

In yet another embodiment, rather than using multiple individual retention clips, a single retention clip assembly may be used to retain multiple battery arrays 278 to the tray 201. One such retention clip assembly 205A is illustrated in FIGS. 11 and 12. The retention clip assembly 205A includes a base 209A and multiple clip arms 211A that extend upwardly from each side of the base 209A. The clip arms 211A may each engage feet 219A of array frames 254A of adjacent battery array 278A, 278B (see FIG. 12).

In another embodiment, a stop block 235 may be received into a recess 299 of the retention clip assembly 205A. The stop block 235 may be received against the base 209A between the clip arms 211A of the retention clip assembly 205A. Alternatively, the stop block 235 elevation may be controlled by engaging the tops of the retention clips 205, or the tops of the feet 219. The stop block 235 can be positioned to arrest loads applied in the X direction. In one embodiment, the stop block 235 is made of either plastic or rubber materials. However, other materials are also contemplated within the scope of this disclosure.

The various battery array design features described above and illustrated with respect to FIGS. 2-12 are intended as non-limiting embodiments only. Any feature shown in these figures may be combined with any other feature to create array frames, battery arrays and/or battery packs having unique features.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   positioning an array frame relative to a cooling plate of a battery array, the array frame including a thermal fin located in a first position as the array frame is positioned relative to the cooling plate; and
   flexing the thermal fin to a second, different position in response to contacting the cooling plate.

2. The method as recited in claim 1, wherein flexing the thermal fin includes tucking a bent end portion of a leg of the thermal fin into a relief notch of an adjacent array frame.

3. The method as recited in claim 1, comprising connecting the array frame to a second array frame prior to positioning the array frame.

4. The method as recited in claim 1, wherein the thermal fin includes a body and a leg, and the leg is movable between the first position in which it extends at an obtuse angle relative to the body and the second position in which it is perpendicular to the body.

5. The method as recited in claim 1, comprising:
   dissipating heat from a battery cell, into the thermal fin, and then into the cooling plate; or adding heat from the cooling plate, into the thermal fin, and then into the battery cell.

6. The method as recited in claim 1, wherein the thermal fin includes a metallic body embedded in the array frame and a leg that extends outside of the array frame.

7. The method as recited in claim 6, wherein the metallic body is an aluminum body.

8. The method as recited in claim 6, wherein the metallic body is molded into the array frame.

9. The method as recited in claim 6, wherein the leg extends outboard of an outermost surface of the array frame.

10. The method as recited in claim 6, wherein one end of the metallic body is received in a groove of a top surface of the array frame, an opposite end of the metallic body extends through a passage of a bottom surface of the array frame, and the leg extends beneath the bottom surface.

11. The method as recited in claim 1, wherein a first single battery cell is housed within a first pocket on a first side of the array frame and a second single battery cell is housed within a second pocket on a second side of the array frame.

12. The method as recited in claim 1, wherein the thermal fin is segmented into a plurality of leg portions by notches or cuts.

13. The method as recited in claim 1, wherein the thermal fin is positioned in direct contact with a thermal interface material disposed on the cooling plate.

14. The method as recited in claim 2, wherein the array frame and the adjacent array frame are snapped together.

15. The method as recited in claim 14, wherein one of the array frame and the adjacent array frame includes a flexible snap arm and the other of the array frame and the adjacent array frame includes a rigid snap arm, and further wherein the flexible snap arm engages the rigid snap arm to connect the array frame to the adjacent array frame.

16. A method, comprising:
   snapping a first battery array frame into abutting engaging with a second battery array frame,
   wherein the first battery array frame includes a plastic array frame body and a metallic thermal fin,
   wherein the metallic thermal fin includes a body embedded in the plastic array frame body and a leg that extends outside of the plastic array frame body;
   positioning the first battery array frame relative to a cooling plate,
   wherein the leg of the metallic thermal fin extends in a first position during the positioning; and
   flexing the leg of the metallic thermal fin to a second, different position in response to contacting the cooling plate,
   wherein, in the second, different position, a bent end portion of the leg of the metallic thermal fin is received within a relief notch of the second battery array frame.

* * * * *